US010434868B2

(12) United States Patent
Nishioka et al.

(10) Patent No.: US 10,434,868 B2
(45) Date of Patent: Oct. 8, 2019

(54) GRILLE SHUTTER CONTROL DEVICE

(71) Applicant: TOYOTA JIDOSHA KABUSHIKI KAISHA, Toyota-shi, Aichi-ken (JP)

(72) Inventors: Hideo Nishioka, Toyota (JP); Yoichi Onishi, Okazaki (JP); Shuichi Morie, Toyota (JP); Masafumi Nakamine, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/104,256

(22) Filed: Aug. 17, 2018

(65) Prior Publication Data

US 2019/0100098 A1  Apr. 4, 2019

(30) Foreign Application Priority Data

Oct. 4, 2017 (JP) ................. 2017-194367

(51) Int. Cl.
*B60K 11/08* (2006.01)
*F01P 11/10* (2006.01)
*B60K 11/02* (2006.01)

(52) U.S. Cl.
CPC ............ *B60K 11/085* (2013.01); *B60K 11/02* (2013.01); *F01P 11/10* (2013.01); *F01P 2031/00* (2013.01)

(58) Field of Classification Search
CPC ..... B60K 11/085; F01P 11/10; F01P 2031/00; F01P 2025/34; F01P 2025/36; B60Y 2306/13; B60Y 2306/15; B60W 50/0205; B60W 50/0225; B60W 50/04; B60W 2050/021
See application file for complete search history.

(56) References Cited

U.S. PATENT DOCUMENTS

| 8,645,028 | B2* | 2/2014 | Mochizuki | ........... | B60K 11/085 |
| | | | | | 123/41.05 |
| 8,983,736 | B2* | 3/2015 | Hirota | .................. | B60K 11/085 |
| | | | | | 123/41.04 |
| 9,409,474 | B2* | 8/2016 | Macfarlane | ............... | F01P 7/12 |
| 9,827,845 | B2* | 11/2017 | Miyaji | ...................... | F01P 7/12 |

(Continued)

FOREIGN PATENT DOCUMENTS

JP 2012-121514 A 6/2012
JP 2012-197001 A 10/2012

(Continued)

*Primary Examiner* — James A Shriver, II
*Assistant Examiner* — Steve Clemmons
(74) *Attorney, Agent, or Firm* — Oliff PLC

(57) ABSTRACT

A grille shutter control device includes a control section and a diagnostic section. The control section is connected to a communication line in a vehicle and controls opening and closing of a grille shutter that introduces air to a cooling target of the vehicle. In a case in which a communications fault is detected, the control section controls to open the grille shutter. The diagnostic section is connected to the communication line and detects a degree of opening of the grille shutter by communicating with the control section. A temperature detection section detects a temperature of the cooling target. In a case in which the communications fault is detected, the diagnostic section diagnoses a malfunction of the grille shutter if a temperature detected by the temperature detection section is higher than a pre-specified threshold.

4 Claims, 4 Drawing Sheets

(56) References Cited

U.S. PATENT DOCUMENTS

| | | | | |
|---|---|---|---|---|
| 9,975,421 B2* | 5/2018 | Froling | ............... | B60K 11/04 |
| 10,017,047 B2* | 7/2018 | Dudar | ............... | B60K 6/48 |
| 10,343,512 B2* | 7/2019 | Tanaka | ............... | B60K 11/06 |
| 2009/0295559 A1* | 12/2009 | Howell | ............... | B60Q 11/00 |
| | | | | 340/459 |
| 2013/0046445 A1 | 2/2013 | Nishimura et al. | | |
| 2013/0275009 A1 | 10/2013 | Sakai | | |
| 2013/0338870 A1* | 12/2013 | Farmer | ............... | B60K 11/085 |
| | | | | 701/29.2 |
| 2014/0005896 A1 | 1/2014 | Hirota et al. | | |
| 2015/0298539 A1* | 10/2015 | Solazzo | ............... | B60K 11/085 |
| | | | | 454/143 |
| 2018/0112586 A1* | 4/2018 | Kwon | ............... | F01P 7/026 |

FOREIGN PATENT DOCUMENTS

| | | | | |
|---|---|---|---|---|
| JP | 5298239 B2 | 9/2013 | | |
| JP | 2015129460 A * | 7/2015 | ............ | B60K 11/085 |

\* cited by examiner

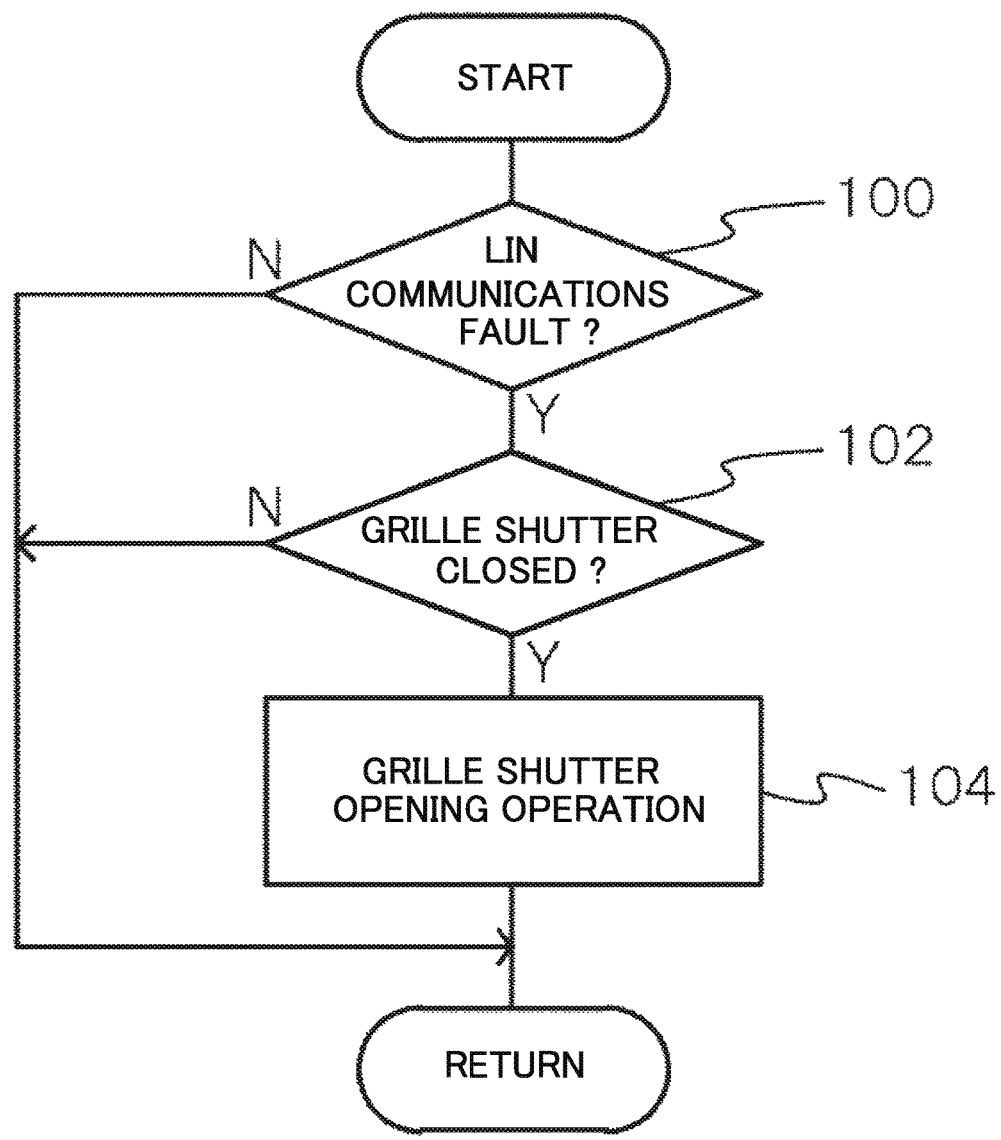

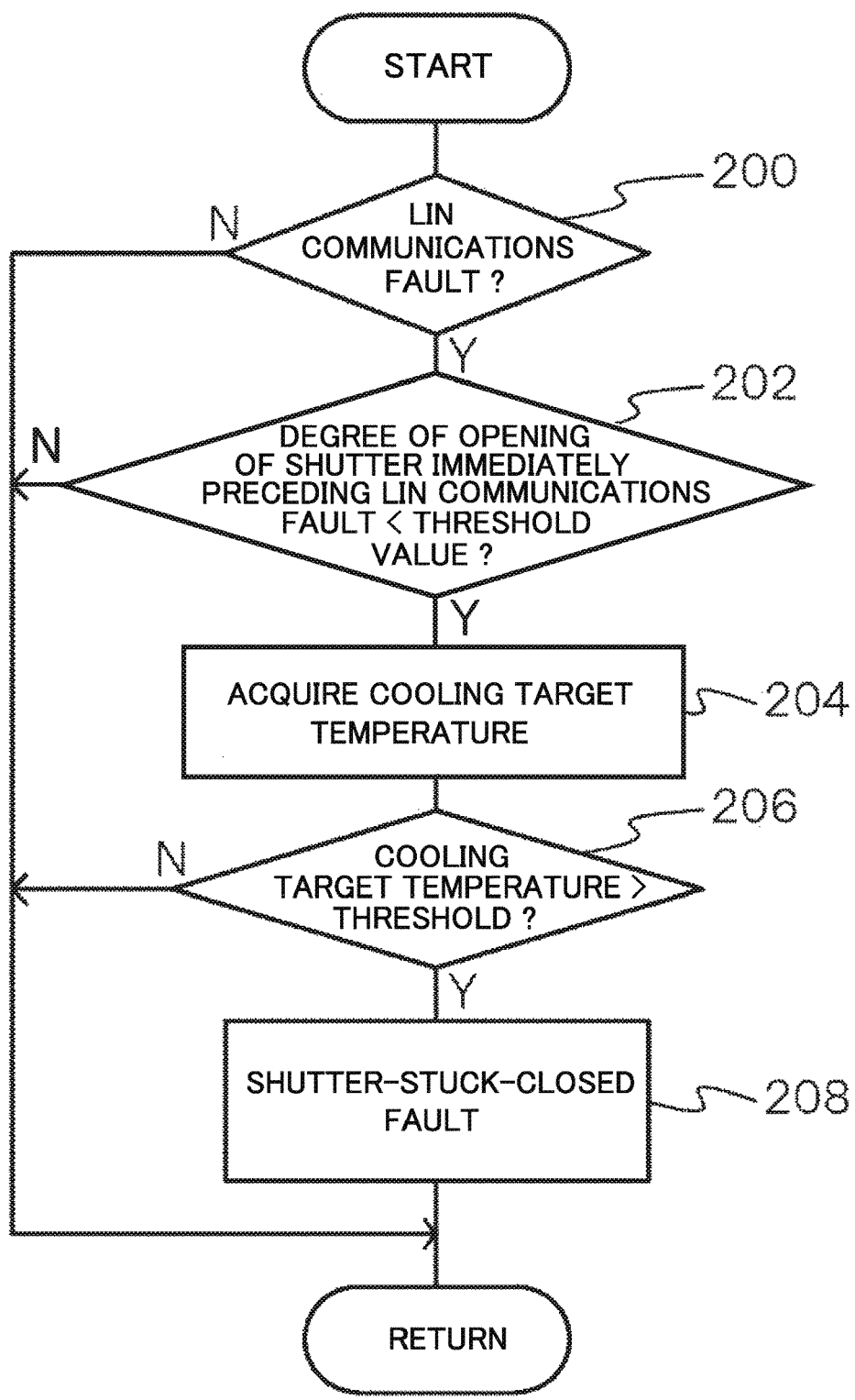

GRILLE SHUTTER CONTROL DEVICE

CROSS-REFERENCE TO RELATED APPLICATION

This application claims priority under 35 USC 119 from Japanese Patent Application No. 2017-194367, filed on Oct. 4, 2017, the disclosure of which is incorporated by reference herein.

BACKGROUND

Technical Field

The present disclosure relates to a grille shutter control device that controls driving of an openable and closable grille shutter provided at a vehicle front portion.

Related Art

Japanese Patent Application Laid-Open (JP-A) No. 2012-121514 proposes a grille shutter opening and closing control device equipped with: a grille shutter that opens and closes a grille aperture portion that introduces air into an engine compartment; shutter opening and closing operating means including a drive source that operates to open and close the grille shutter; closing operation judging means that inputs vehicle information and, on the basis of the vehicle information, judges whether or not to operate the grille shutter in the closing direction thereof; and drive source torque controlling means that, if the engine has stopped when the grille shutter is being operated in the closing direction by the closing operation judging means, controls the drive source of the shutter opening and closing operating means so as to operate the grille shutter at a low torque that is lower than a high torque for when the grille shutter is being operated to open. Thus, with the technology of JP-A No. 2012-121514, operation noise of the grille shutter may be reduced if the engine has stopped.

However, devices inside the vehicle such as a control unit and the like that control the grille shutter are connected by and communicate over communication lines in the vehicle, but the technology recited in JP-A No. 2012-121514 gives no consideration to situations in which communications faults occur. For example, in a high-noise environment such as at an airport, below a high-voltage transmission line, near a mobile telephone base station or the like, a communications fault may occur and the communications fault may be misdiagnosed as a malfunction of the grille shutter. Therefore, there is scope for improvement.

SUMMARY

The present disclosure provides a grille shutter control device that may accurately diagnose a malfunction of a grille shutter even in a case in which a communications fault occurs.

A first aspect of the present disclosure is a grille shutter control device including: a control section connected to a communication line in a vehicle, the control section controlling opening and closing of a grille shutter that introduces air to a cooling target of the vehicle, and controlling to open the grille shutter in a case in which a communications fault is detected; and a diagnostic section connected to the communication line, the diagnostic section detecting a degree of opening of the grille shutter by communicating with the control section, and, in a case in which the communications fault is detected, the diagnostic section diagnosing a malfunction of the grille shutter if a temperature detected by a temperature detection section is higher than a pre-specified threshold, the temperature detection section detecting a temperature of the cooling target.

According to the first aspect of the present disclosure, the control section is connected to the communication line in the vehicle and controls opening and closing of the grille shutter that introduces air to the cooling target of the vehicle. In a case in which a communications fault is detected, the grille shutter is controlled by the control section such that the grille shutter opens. That is, the grille shutter opens as a failsafe and overheating of the cooling target is inhibited.

The diagnostic section is also connected to the communication line and is capable of detecting a degree of opening of the grille shutter by communicating with the control section. The temperature detection section detects the temperature of the cooling target. In a case in which a communications fault is detected, then when a temperature detected by the temperature detection section is higher than the pre-specified threshold, the diagnostic section diagnoses a malfunction of the grille shutter. That is, in a case in which a communications fault has occurred, if the temperature of the cooling target is rising even though the grille shutter is intended to be open, this may be diagnosed as a malfunction such as sticking of the grille shutter or the like. Therefore, the first aspect of the present disclosure may accurately diagnose a malfunction of the grille shutter even in a case in which a communications fault occurs.

A second aspect of the present disclosure is a grille shutter control device including: a control section connected to a communication line in a vehicle, the control section controlling opening and closing of a grille shutter that introduces air to a cooling target of the vehicle, and controlling to open the grille shutter in a case in which a communications fault is detected; and a diagnostic section connected to the communication line, the diagnostic section detecting a degree of opening of the grille shutter by communicating with the control section, and, in a case in which the communications fault is detected, the diagnostic section diagnosing a malfunction of the grille shutter if a degree of opening of the grille shutter immediately preceding the communications fault is less than a pre-specified threshold value and a temperature detected by a temperature detection section is higher than a pre-specified threshold, the temperature detection section detecting a temperature of the cooling target.

According to the second aspect of the present disclosure, the control section is connected to the communication line in the vehicle and controls opening and closing of the grille shutter that introduces air to the cooling target of the vehicle. In a case in which a communications fault is detected, the grille shutter is controlled by the control section such that the grille shutter opens. That is, the grille shutter opens as a failsafe and overheating of the cooling target is inhibited.

The diagnostic section is also connected to the communication line and is capable of detecting a degree of opening of the grille shutter by communicating with the control section. The temperature detection section detects the temperature of the cooling target. In a case in which a communications fault is detected, then when the degree of opening of the grille shutter just before the communications fault is less than the pre-specified threshold value and a temperature detected by the temperature detection section is higher than the pre-specified threshold, the diagnostic section diagnoses a malfunction of the grille shutter. That is, if the degree of opening of the grille shutter immediately preceding the communications fault is less than the pre-specified threshold value, the grille shutter is intended to be opened by the control section in a case in which the communications fault occurs. Therefore, if the temperature of the cooling target is rising, this may be diagnosed as a malfunction of the grille shutter. Therefore, the second aspect of the present disclosure may accurately diagnose a malfunction of the grille shutter even in a case in which a communications fault occurs.

In a third aspect of the present disclosure, in the aspects described above, the communication line may be a communication line for LIN communications.

An LIN communication line has low resistance to noise and it is likely that a communications fault would be misdiagnosed as a malfunction of a grille shutter. However, the third aspect of the present disclosure may suppress this misdiagnosis.

According to the above-described aspects, a grille shutter control device of the present disclosure may accurately diagnose a malfunction of a grille shutter even in a case in which a communications fault occurs.

BRIEF DESCRIPTION OF THE DRAWINGS

Exemplary embodiments will be described in detail based on the following figures, wherein:

FIG. 3 is a flowchart showing a flow of processing that is executed by a grille shutter ECU of the grille shutter control device according to the present exemplary embodiment; and FIG. 4 is a flowchart showing a flow of processing that is executed by an engine ECU of the grille shutter control device according to the present exemplary embodiment.

DETAILED DESCRIPTION

Figure 1:
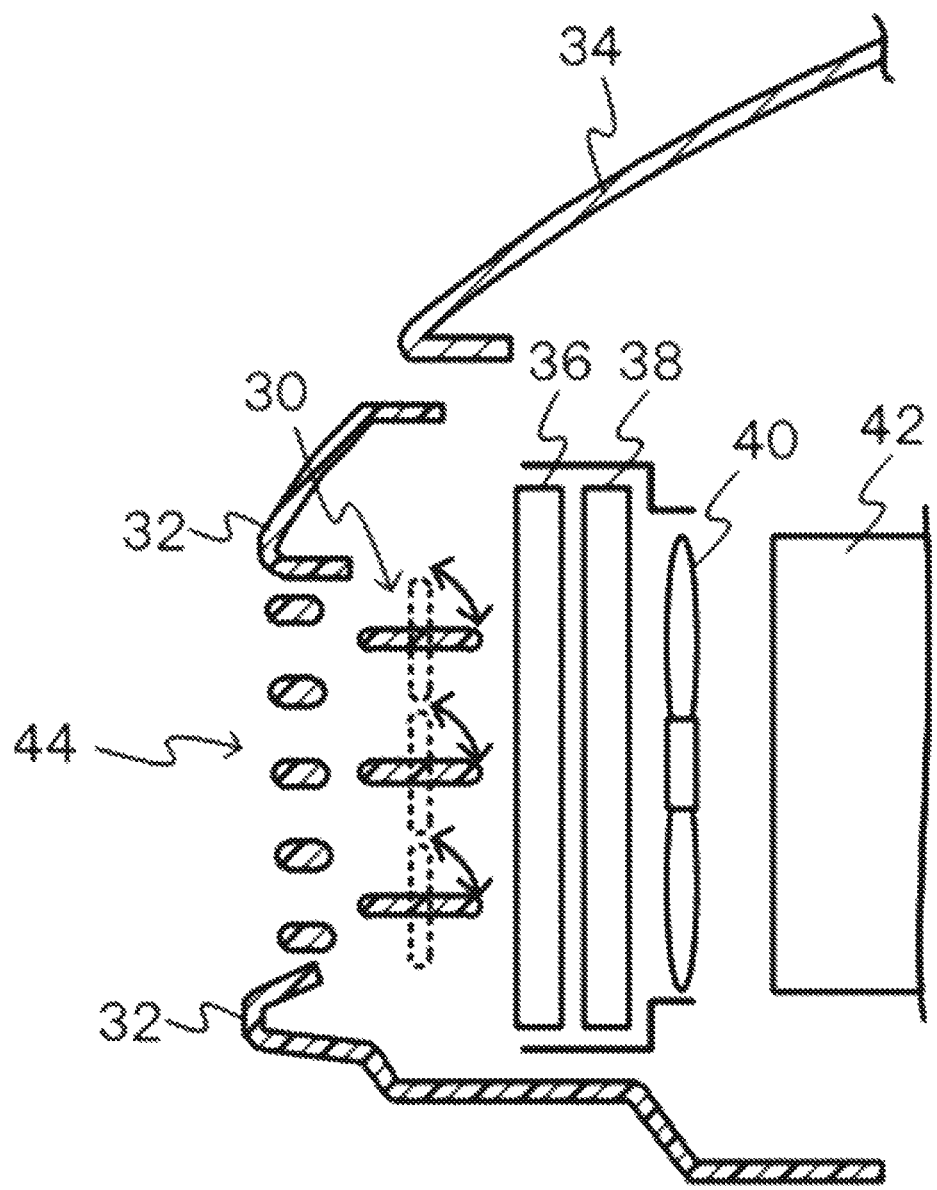
FIG. 1 is a sectional diagram showing structures in a vehicle body front region of a vehicle in which a grille shutter is provided, which grille shutter is a control object of a grille shutter control device according to a present exemplary embodiment.

Herebelow, an exemplary embodiment of the present disclosure is described in detail with reference to the attached drawings. FIG. 1 is a sectional diagram showing structures in a vehicle body front region of a vehicle in which a grille shutter is provided, which grille shutter is a control object of a grille shutter control device according to the present exemplary embodiment. In the present exemplary embodiment described below, a situation is described in which cooling water of an engine 42 is applied as a cooling target of a grille shutter 30.

A bumper cover 32 and an engine hood 34 are provided at the vehicle body front region of the vehicle. At the inner side of the engine hood 34, a condenser 36 for air conditioning, a radiator 38 that releases heat from the cooling water serving as the cooling target, a radiator fan 40 and the engine 42 are mounted in this order from the front of the vehicle.

The bumper cover 32 is equipped with a grille 44. The grille 44 is provided at the vehicle front side of the condenser 36 and the radiator 38. When the radiator fan 40 provided at the vehicle rear side of the radiator 38 is driven, air may be introduced through the grille 44 and fed to the condenser 36 and the radiator 38.

The grille shutter 30 is provided at the grille 44, at the vehicle front side of the condenser 36 and the radiator 38. The grille shutter 30 is controlled by a grille shutter electronic control unit (ECU) 14 (not shown in FIG. 1; see FIG. 2), which is described below. As illustrated by the arrows in FIG. 1, the grille shutter 30 is openable and closable between an open state (the solid lines in FIG. 1) and a closed state (the broken lines in FIG. 1).

Figure 2:
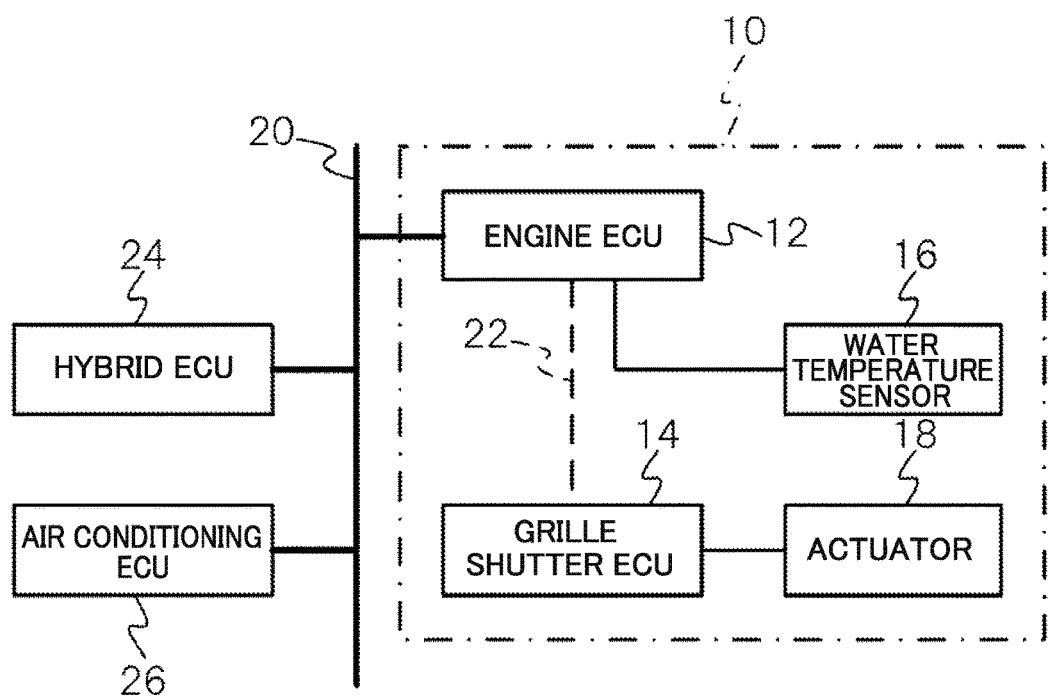
FIG. 2 is a block diagram showing schematic structures of the grille shutter control device according to the present exemplary embodiment.

Now configuration of a grille shutter control device 10 according to the present exemplary embodiment are described. FIG. 2 is a block diagram showing schematic structures of the grille shutter control device 10 according to the present exemplary embodiment.

The grille shutter control device 10 according to the present exemplary embodiment includes an engine ECU 12 that serves as a diagnostic section, the grille shutter ECU 14 that serves as a control section, a water temperature sensor 16 that serves as a temperature detection section, and an actuator 18.

The engine ECU 12 is connected to a CAN communication line 20 of a Controller Area Network (CAN) communications system, which is configured in the form of a bus-type network that connects plural ECUs through two common communication lines. The engine ECU 12 controls operations of the engine 42, which is a drive source of the vehicle, and controls opening and closing of the grille shutter 30 via the grille shutter ECU 14. The water temperature sensor 16, which detects temperatures of the cooling water, is connected to the engine ECU 12. In addition to the engine ECU 12, the CAN communication line 20 is also connected to, for example, a hybrid ECU 24 that controls a hybrid system, an air conditioning ECU 26 that controls air conditioning, and so forth. The CAN communication line 20 enables transfers of information between the ECUs. Sensors other than the water temperature sensor 16 that are also connected to the engine ECU 12 are not described in the present exemplary embodiment.

The actuator 18 is a motor or the like for driving opening and closing of the grille shutter 30. The actuator 18 is connected to the grille shutter ECU 14. By controlling driving of the actuator 18, the grille shutter ECU 14 controls opening and closing of the grille shutter 30.

The engine ECU 12 and the grille shutter ECU 14 are connected by a Local Interconnect Network (LIN) communication line 22 that serves as a communication line. The engine ECU 12 and the grille shutter ECU 14 communicate over the LIN communication line 22 and transfers of information. An LIN network is a multiplex communications network directed mainly at data communications between body control ECUs. A bus is configured for each of respective systems. Signals exchanged by LIN communications may be sent to the CAN communication line 20 by an ECU connected to the CAN communication line 20. An LIN communication line is a single communication wire and transfers digital signals conforming to a dedicated communications protocol.

To be specific, in accordance with a water temperature detected by the water temperature sensor 16, the engine ECU 12 uses LIN communications to send an opening or closing request for the grille shutter 30 to the grille shutter ECU 14. In response to the request from the engine ECU 12, the grille shutter ECU 14 opens or closes the grille shutter 30 by controlling driving of the actuator 18.

As well as requests from the engine ECU 12, the grille shutter ECU 14 controls opening and closing of the grille shutter 30 in response to requests from other ECUs such as the hybrid ECU 24, the air conditioning ECU 26 and the like.

The CAN network employs a two-wire differential voltage system to transmit data based on the presence or absence of a difference between voltages flowing in two wires (a twisted pair). Even if external noise is applied, the differential voltage between the wires is not altered. Therefore, the CAN network is less affected by noise. In contrast, because LIN communications use a single wire, LIN communications are more vulnerable to the effects of noise and communications faults are more likely to occur.

The vehicle moves to various locations. Consequently, when the vehicle is moving in high-noise environments, communications faults occur. For example, a communications fault is caused by noise when the vehicle is parked below a high-voltage transmission line. When an LIN communications fault occurs, the engine ECU 12 cannot communicate with the grille shutter ECU 14. As a result, the communications fault may be misdiagnosed as a malfunction of the grille shutter 30.

Accordingly, in a case in which an LIN communications fault is detected, the grille shutter ECU 14 drives the actuator 18 so as to open the grille shutter 30, in order to prevent overheating or the like (a failsafe).

Meanwhile, the engine ECU 12 executes processing to reliably diagnose system faults such as malfunctions of the grille shutter 30 and the like. To be specific, in a case in which an LIN communications fault is detected, because the engine ECU 12 cannot communicate with the grille shutter ECU 14, the engine ECU 12 cannot verify an opened or closed state of the grille shutter 30. Accordingly, the engine ECU 12 memorizes degrees of opening of the grille shutter 30 before an LIN communications fault. After an LIN communications fault occurs in a state in which the grille shutter 30 was in the closed state immediately preceding the LIN communications fault (the degree of opening was less than a threshold value), if the water temperature rises regardless of control by the grille shutter ECU 14 to open the grille shutter 30, the engine ECU 12 determines that the grille shutter 30 is stuck in the closed state. Thus, a malfunction of the grille shutter 30 may be reliably diagnosed even in a case in which an LIN communications fault occurs.

Now, specific processing that is carried out by the grille shutter control device 10 according to the present exemplary embodiment structured as described above is described.

First, processing that is executed by the grille shutter ECU 14 is described. FIG. 3 is a flowchart showing an example of the flow of processing that is executed by the grille shutter ECU 14 of the grille shutter control device 10 according to the present exemplary embodiment.

In step 100, the grille shutter ECU 14 makes a determination as to whether there is an LIN communications fault. This determination is, for example, a determination as to whether reception of data via the LIN communication line has exceeded a pre-specified duration, whether a data discrepancy has arisen, or the like. If the determination is affirmative, the grille shutter ECU 14 proceeds to step 102, and if the determination is negative, the grille shutter ECU 14 ends the present processes and returns (ending and returning to step 100 or proceeding to alternative processing).

In step 102, the grille shutter ECU 14 makes a determination as to whether the grille shutter 30 is in the closed state. This determination is made based on determining whether the grille shutter 30 is in the opened state or the closed state by, for example, a count of motor steps of the actuator 18, a driving duration of the actuator 18 or the like. If the determination is affirmative, the grille shutter ECU 14 proceeds to step 104, and if the determination is negative, the grille shutter ECU 14 ends the present processes and returns.

In step 104, the grille shutter ECU 14 drives the actuator 18, operating to open the grille shutter 30. Then the grille shutter ECU 14 ends the present processes and returns. That is, when there is an LIN communications fault, as a failsafe, the grille shutter 30 is imperatively operated to open irrespective of the temperature of the cooling water. Therefore, overheating may be inhibited even in a case in which communications with the engine ECU 12 are not possible.

Now, processing that is executed by the engine ECU 12 is described. FIG. 4 is a flowchart showing an example of the flow of processing that is executed by the engine ECU 12 of the grille shutter control device 10 according to the present exemplary embodiment.

In step 200, the engine ECU 12 makes a determination as to whether there is an LIN communications fault. This determination is, for example, a determination as to whether reception of data via the LIN communication line has exceeded a pre-specified duration, whether a data discrepancy has arisen, or the like. If the determination is affirmative, the engine ECU 12 proceeds to step 202, and if the determination is negative, the engine ECU 12 ends the present processes and returns (ending and returning to step 200 or proceeding to alternative processing).

In step 202, the engine ECU 12 makes a determination as to whether or not the grille shutter 30 is in the closed state by determining whether or not a degree of opening of the grille shutter 30 immediately preceding the LIN communications fault is less than a pre-specified threshold value. If the determination is affirmative, the engine ECU 12 proceeds to step 204, and if the determination is negative, the engine ECU 12 ends the present processes and returns.

In step 204, the engine ECU 12 acquires a sensing result from the water temperature sensor 16, to serve as a cooling target temperature, and then proceeds to step 206.

In step 206, the engine ECU 12 makes a determination as to whether the cooling target temperature is higher than a pre-specified threshold. That is, in a case in which an LIN communications fault occurs, the engine ECU 12 makes a determination as to whether the water temperature is rising regardless of the grille shutter ECU 14 performing the control to open the grille shutter 30. If the determination is affirmative, the engine ECU 12 proceeds to step 208, and if the determination is negative, the engine ECU 12 ends the present processes and returns.

In step 208, the engine ECU 12 diagnoses a shutter-stuck-closed fault, and then ends the present processes and returns. In a case in which a shutter-stuck-closed fault is diagnosed, the engine ECU 12, for example, reports the malfunction of the grille shutter 30 to a vehicle occupant by executing processing to illuminate a warning light or the like.

Thus, in a case in which an LIN communications fault occurs, the engine ECU 12 diagnoses a malfunction of the grille shutter if the degree of opening of the grille shutter 30 immediately preceding the fault was less than the pre-specified threshold value and the temperature of the cooling target rises above the pre-specified threshold. Therefore, the engine ECU 12 may accurately diagnose a malfunction of the grille shutter 30 even in a case in which an LIN communications fault occurs. Furthermore, misdiagnosis of a communications fault as a malfunction of the grille shutter 30 in a case in which the water temperature is not rising may be suppressed.

In the exemplary embodiment described above, the engine ECU 12 makes a determination in step 202 as to whether the degree of opening of the grille shutter 30 immediately preceding the LIN communications fault is less than the threshold value. However, this step may be omitted. That is, because the grille shutter 30 is intended to be opened as a failsafe, if the water temperature rises when an LIN communications fault has occurred, this may be diagnosed as a fault of the grille shutter 30 being stuck.

In the exemplary embodiment described above, a case in which the engine ECU 12 and the grille shutter ECU 14 are connected by the LIN communication line 22 has been described. However, the present disclosure is not limited thereto. For example, configurations are possible in which the ECUs are connected by a communication line that is susceptible to the effects of environmental noise other than LIN communications.

In the exemplary embodiment described above, a case in which cooling water of the engine 42 is applied as the cooling target of the grille shutter 30, has been described. However, the cooling target is not limited thereto. For example, in a hybrid vehicle, an electric car or the like, the cooling target may be a coolant of an inverter, a coolant of a battery, the battery or the like. Alternatively, in a turbo-equipped vehicle, the cooling target may be a coolant of an intercooler, or in a fuel cell vehicle, the cooling target may be a fuel cell or the like.

The processing illustrated in FIG. 3 and FIG. 4 executed by the grille shutter control device 10 of the exemplary embodiment described above may be software processing that is implemented by programs being executed. However, the processing may be implemented in hardware. Alternatively, the processing may combine both software and hardware. Further, if the processing is implemented in software, the programs may be memorized in any of various storage media and distributed.

The present disclosure is not limited by the above. In addition to the above exemplary embodiments, it will be clear that numerous modifications may be embodied within a technical scope not departing from the gist of the disclosure.

What is claimed is:

1. A grille shutter control device comprising:
a control section connected to a communication line in a vehicle, the control section controlling opening and closing of a grille shutter that introduces air to a cooling target of the vehicle, and controlling to open the grille shutter in a case in which a communications fault is detected; and
a diagnostic section connected to the communication line, the diagnostic section detecting a degree of opening of the grille shutter by communicating with the control section, and, in a case in which the communications fault is detected, the diagnostic section diagnosing a malfunction of the grille shutter if a temperature detected by a temperature detection section is higher than a pre-specified threshold, the temperature detection section detecting a temperature of the cooling target.

2. The grille shutter control device according to claim 1, wherein the communication line is a communication line for LIN communications.

3. A grille shutter control device comprising:
a control section connected to a communication line in a vehicle, the control section controlling opening and closing of a grille shutter that introduces air to a cooling target of the vehicle, and controlling to open the grille shutter in a case in which a communications fault is detected; and
a diagnostic section connected to the communication line, the diagnostic section detecting a degree of opening of the grille shutter by communicating with the control section, and, in a case in which the communications fault is detected, the diagnostic section diagnosing a malfunction of the grille shutter if a degree of opening of the grille shutter immediately preceding the communications fault is less than a pre-specified threshold value and a temperature detected by a temperature detection section is higher than a pre-specified threshold, the temperature detection section detecting a temperature of the cooling target.

4. The grille shutter control device according to claim 3, wherein the communication line is a communication line for LIN communications.

* * * * *